(12) United States Patent
Bayer et al.

(10) Patent No.: US 12,343,920 B2
(45) Date of Patent: Jul. 1, 2025

(54) PROCESS AND EQUIPMENT TO REGULATE THE THICKNESS OF ORIENTED TUBULAR FILM THAT IS MANUFACTURED IN A FILM BLOWING PROCESS

(71) Applicant: HOSOKAWA ALPINE Aktiengesellschaft, Augsburg (DE)

(72) Inventors: Bernd Bayer, Bobingen (DE); Georg Scharpf, Mühlhausen (DE); Hans-Peter Schüle, Augsburg (DE)

(73) Assignee: HOSOKAWA ALPINE Aktiengesellschaft, Augsburg (DE)

( * ) Notice: Subject to any disclaimer, the term of this patent is extended or adjusted under 35 U.S.C. 154(b) by 156 days.

(21) Appl. No.: 18/100,025

(22) Filed: Jan. 23, 2023

(65) Prior Publication Data

US 2023/0241830 A1    Aug. 3, 2023

(30) Foreign Application Priority Data

Jan. 29, 2022   (DE) ..................... 10 2022 000 351.1

(51) Int. Cl.
*B29C 48/92*      (2019.01)
*B29C 48/00*      (2019.01)
*B29C 55/28*      (2006.01)

(52) U.S. Cl.
CPC .......... *B29C 48/92* (2019.02); *B29C 48/0018* (2019.02); *B29C 48/0022* (2019.02);
(Continued)

(58) Field of Classification Search
None
See application file for complete search history.

(56) References Cited

U.S. PATENT DOCUMENTS 1,948,609 A    2/1934  Andrews
2,206,981 A    7/1940  Sturtevant
(Continued)

FOREIGN PATENT DOCUMENTS

AT              304 058 B     12/1972
BR      102019026088 A2      7/2020
(Continued)

OTHER PUBLICATIONS

For U.S. Appl. No. 16/600,260: Final Office Action dated Apr. 13, 2022.
(Continued)

*Primary Examiner* — Virak Nguon
(74) *Attorney, Agent, or Firm* — Paul D. Bianco; Fleit Intellectual Property Law

(57) ABSTRACT

The thickness profile of a film tube manufactured using a film blowing process is regulated using a control system consisting of segmented control zones and at least at two measuring units for the film thickness such that the specified target film thickness profile exhibits deviations from a uniform film thickness in the form of one or two thin spots opposite each other, which serve to compensate for film thickness changes across the film width which occur during the monoaxial orientation in machine direction so that a film web is produced as a result of orientation whose thickness profile has as few deviations as possible from the target thickness across the entire width of the film web, the final film should exhibit a thickness profile where the thickness increase from the middle of the film to the edges is as minor as possible and the flatness of the film is improved.

16 Claims, 2 Drawing Sheets

(52) U.S. Cl.
CPC ........ B29C 55/28 (2013.01); *B29C 2793/009* (2013.01); *B29C 2948/92152* (2019.02); *B29C 2948/92447* (2019.02); *B29C 2948/92647* (2019.02)

(56) References Cited

U.S. PATENT DOCUMENTS

| | | |
|---|---|---|
| 2,780,443 A | 2/1957 | Holloway |
| 3,493,184 A | 2/1970 | Horrocks |
| 3,734,413 A | 5/1973 | Kaiser |
| 3,770,124 A | 11/1973 | Frangquist |
| 3,809,515 A | 5/1974 | Farrell |
| 3,962,023 A | 6/1976 | Hofer |
| 4,003,973 A | 1/1977 | Kurokawa |
| 4,018,388 A | 4/1977 | Andrews |
| 4,080,143 A | 3/1978 | Upmeier |
| 4,133,488 A | 1/1979 | Heinemann |
| 4,165,356 A | 8/1979 | Heider |
| 4,510,300 A | 4/1985 | Levy |
| 4,538,764 A | 9/1985 | Dunbar |
| 4,602,743 A | 7/1986 | Nied |
| 4,858,422 A | 8/1989 | Stahlecker |
| RE33,085 E | 10/1989 | Petersen |
| 4,905,918 A | 3/1990 | Selles |
| 4,994,214 A | 2/1991 | Stevens |
| 5,043,036 A | 8/1991 | Swenson |
| 5,076,776 A | 12/1991 | Yamada et al. |
| 5,120,431 A | 6/1992 | Cordonnier |
| 5,135,614 A | 8/1992 | Aula |
| 5,358,163 A | 10/1994 | Naka |
| 5,370,327 A | 12/1994 | Adamski |
| 5,377,843 A | 1/1995 | Schumacher |
| 5,377,931 A | 1/1995 | Dortel |
| 5,505,601 A | 4/1996 | Sensen et al. |
| 5,544,841 A | 8/1996 | Didier et al. |
| 5,558,930 A | 9/1996 | DiPoto |
| 5,673,870 A | 10/1997 | Fielding et al. |
| 5,716,650 A | 2/1998 | Marridis |
| 5,716,751 A | 2/1998 | Bertrand |
| 5,735,481 A | 4/1998 | Loosen |
| 5,769,362 A | 6/1998 | Biagiotti |
| 5,967,449 A | 10/1999 | Thomas et al. |
| 5,992,773 A | 11/1999 | Schwechten |
| 6,054,178 A | 4/2000 | Howells |
| 6,169,122 B1 | 1/2001 | Blizard |
| 6,189,821 B1 | 2/2001 | James |
| 6,224,004 B1 | 5/2001 | Kato |
| 6,260,786 B1 | 7/2001 | Ueyama |
| 6,398,139 B1 | 6/2002 | Nied |
| 6,413,595 B1 | 7/2002 | Schirmer |
| 6,543,710 B2 | 4/2003 | Konetzka |
| 6,783,344 B1 | 8/2004 | Rudolf |
| 6,964,394 B1 | 11/2005 | Räty et al. |
| 7,028,931 B2 | 4/2006 | Lin |
| 7,036,763 B2 | 5/2006 | Böhm et al. |
| 7,255,301 B2 | 8/2007 | Schmidt-Hebbel et al. |
| 7,481,390 B2 | 1/2009 | Reinhold |
| 7,596,839 B2 | 10/2009 | Busch |
| 7,811,073 B2 | 10/2010 | Mahler et al. |
| 7,850,102 B2 | 12/2010 | Meier et al. |
| 7,913,851 B2 | 3/2011 | Chang |
| 8,033,399 B2 | 10/2011 | Pistorius |
| 8,039,105 B2 | 10/2011 | Meier et al. |
| 8,231,007 B2 | 7/2012 | Wark |
| 8,309,206 B2 | 11/2012 | Rasmussen |
| 8,322,646 B2 | 12/2012 | Ueyama et al. |
| 8,353,408 B2 | 1/2013 | Ito |
| 8,714,359 B2 | 5/2014 | Aizawa |
| 8,784,716 B2 | 7/2014 | Rasmussen |
| 9,022,222 B2 | 5/2015 | Devroe |
| 9,302,423 B2 | 4/2016 | Bayer |
| 9,333,699 B2 | 5/2016 | Linkies |
| 10,052,799 B2 | 8/2018 | Bayer |
| 10,137,629 B2 | 11/2018 | Gandelheidt |
| 10,252,298 B2 | 4/2019 | Knauer et al. |
| 10,906,232 B2 | 2/2021 | Gandelheidt |
| 11,339,021 B2 | 5/2022 | Durner |
| 11,358,324 B2 | 6/2022 | Backmann |
| 11,654,605 B2 | 5/2023 | Baier |
| 2002/0086071 A1 | 7/2002 | Rubhausen |
| 2005/0202205 A1 | 9/2005 | Peterson |
| 2009/0104465 A1 | 4/2009 | Yanagida |
| 2010/0173031 A1 | 7/2010 | Roberts et al. |
| 2010/0216963 A1 | 8/2010 | Ueda |
| 2010/0320308 A1 | 12/2010 | Ueyama et al. |
| 2011/0006452 A1* | 1/2011 | Bayer .................. B29C 48/913 425/141 |
| 2011/0229722 A1 | 9/2011 | Rivett |
| 2014/0177235 A1 | 6/2014 | Lin |
| 2014/0367882 A1 | 12/2014 | Backmann |
| 2016/0052192 A1 | 2/2016 | Backmann |
| 2016/0257056 A1 | 9/2016 | Schumacher et al. |
| 2016/0263813 A1* | 9/2016 | Lettowsky .............. B29C 55/28 |
| 2017/0036386 A1 | 2/2017 | Planeta et al. |
| 2020/0114564 A1 | 4/2020 | Baier |
| 2020/0180890 A1 | 6/2020 | Durner et al. |
| 2021/0221043 A1 | 7/2021 | Bayer |
| 2022/0105520 A1 | 4/2022 | Fuchs |
| 2024/0083083 A1* | 3/2024 | Golubski ............ B29C 37/0096 |

FOREIGN PATENT DOCUMENTS

| | | |
|---|---|---|
| CA | 2191630 A1 | 6/1997 |
| CA | 3064404 A1 | 6/2020 |
| CH | 537800 | 6/1973 |
| CN | 85105182 A | 12/1986 |
| CN | 1500712 A | 6/2004 |
| CN | 101005936 A | 7/2007 |
| CN | 201280352 Y | 7/2009 |
| CN | 101987703 A | 3/2011 |
| CN | 102083722 A | 6/2011 |
| CN | 104070667 A | 3/2013 |
| CN | 104023943 A | 9/2014 |
| CN | 204 183 848 U | 3/2015 |
| CN | 205634333 U | 10/2016 |
| CN | 106467252 A | 3/2017 |
| CN | 107825682 A | 3/2018 |
| CN | 110049856 A | 7/2019 |
| CN | 111302117 A | 6/2020 |
| DE | 291871 C | 5/1916 |
| DE | 22 50 151 A1 | 5/1974 |
| DE | 2555848 | 6/1977 |
| DE | 2919249 A1 | 11/1979 |
| DE | 31 40 294 A1 | 4/1983 |
| DE | 3338138 A1 | 5/1985 |
| DE | 34 25 101 A1 | 1/1986 |
| DE | 4100338 A1 | 7/1992 |
| DE | 4140656 C1 | 9/1992 |
| DE | 4116964 A1 | 11/1992 |
| DE | 9214651 U1 | 2/1993 |
| DE | 4428249 A1 | 2/1995 |
| DE | 4405462 C1 | 4/1995 |
| DE | 295 05 311 U1 | 6/1995 |
| DE | 295 05 311 | 7/1995 |
| DE | 19613902 A1 | 10/1997 |
| DE | 197 28 382 A1 | 1/1999 |
| DE | 19755357 A1 | 6/1999 |
| DE | 198 40 344 A1 | 5/2000 |
| DE | 10035894 A1 | 4/2001 |
| DE | 10029175 | 6/2001 |
| DE | 10059306 C1 | 5/2002 |
| DE | 20117248 U1 | 3/2003 |
| DE | 69715377 T2 | 6/2003 |
| DE | 10 2004 040 151 A1 | 3/2006 |
| DE | 10 2006 048 850 A1 | 4/2008 |
| DE | 20 2008 012076 U1 | 11/2008 |
| DE | 10 2009 033171 A1 | 1/2011 |
| DE | 10 2009 046 593 A1 | 5/2011 |
| DE | 102009046585 A1 | 5/2011 |
| DE | 10 2011 085735 A1 | 5/2013 |
| DE | 10 2013 007 669 | 11/2014 |
| DE | 10 2013 007 669 A1 | 11/2014 |
| DE | 10 2013 016898 A1 | 4/2015 |
| DE | 10 2016 012 389 A1 | 4/2018 |

(56) References Cited

FOREIGN PATENT DOCUMENTS

| | | |
|---|---|---|
| DE | 10 2016 012424 A1 | 4/2018 |
| DE | 102016012388 A1 | 4/2018 |
| DE | 112015001615 B4 | 4/2018 |
| DE | 202013012786 U1 * | 9/2019 |
| DE | 102018009632 A1 | 6/2020 |
| DE | 10 2019 107335 A1 | 7/2020 |
| DE | 10 2019 215 492 A1 | 4/2021 |
| EP | 0139279 A2 | 5/1985 |
| EP | 0449548 A2 | 10/1991 |
| EP | 0471879 A1 | 2/1992 |
| EP | 1947043 A1 | 7/2008 |
| EP | 2261152 A1 | 12/2010 |
| EP | 2277681 A1 | 1/2011 |
| EP | 2639038 A1 | 9/2013 |
| EP | 2873508 A1 | 5/2015 |
| EP | 3266586 A1 | 1/2018 |
| EP | 2326481 B1 | 5/2018 |
| EP | 3666700 A1 | 6/2020 |
| GB | 1331667 A | 9/1973 |
| GB | 2 253 807 A | 9/1992 |
| JP | S58-65628 A | 4/1983 |
| JP | S59-169818 A | 9/1984 |
| JP | S60 141229 U | 9/1985 |
| JP | 10315363 A | 12/1988 |
| JP | 161257 | 6/1992 |
| JP | 15193 | 2/1994 |
| JP | H06-064039 A | 3/1994 |
| JP | H 09-507799 A | 8/1997 |
| JP | 2822758 B2 | 11/1998 |
| JP | 2001080801 A | 3/2001 |
| JP | 2003-072997 A | 3/2003 |
| JP | 4203271 B2 | 12/2008 |
| JP | 2009249178 A | 10/2009 |
| JP | 2011-51782 A | 10/2012 |
| JP | 2013-129169 A | 7/2013 |
| JP | 2013245105 A | 12/2013 |
| JP | 2016044295 A | 4/2016 |
| JP | 2016-117588 A | 6/2016 |
| JP | 2017-036146 | 2/2017 |
| JP | 2018-069639 A | 5/2018 |
| JP | 6918085 B2 | 8/2021 |
| JP | 7216124 B2 | 1/2023 |
| RU | 2060219 C1 | 5/1996 |
| RU | 2 124 465 C1 | 1/1999 |
| RU | 2128617 C1 | 4/1999 |
| RU | 2457945 C2 | 8/2012 |
| RU | 2568482 C2 | 11/2015 |
| RU | 2737008 C1 | 11/2020 |
| RU | 2776380 C1 | 7/2022 |
| SU | 1615113 A1 | 12/1990 |
| TW | M504084 U | 7/2015 |
| WO | 94/12290 A1 | 6/1994 |
| WO | 2005/70653 A1 | 8/2005 |
| WO | 2006/018293 A1 | 2/2006 |
| WO | 2013/064422 A1 | 5/2013 |
| WO | 2014/023282 A1 | 2/2014 |
| WO | 2015/055170 A1 | 4/2015 |
| WO | 2018/079213 A1 | 5/2018 |

OTHER PUBLICATIONS

Office Action dated Oct. 11, 2022 for U.S. Appl. No. 16/600,260.
For U.S. Appl. No. 16/709,025: Notice of Allowances dated Feb. 18, 2022 and Mar. 31, 2022.
Response to Office Action filed Jan. 4, 2022 for U.S. Appl. No. 16/600,260.
Search Report dated Jun. 29, 2020, from Russian Patent Office for RU Appl. No. 2019140284.
Search Report from Taiwan Patent Office dated Oct. 24, 2020, for Application No. 108144774 (1 page).
For Chinese Patent Office for Application No. 201911262431.4, filed Dec. 11, 2019: Search Report (2 pages) Office Action dated Dec. 17, 2020 (11 pages).
For Canadian Patent Application No. 3, 106,631: Office Action dated Apr. 8, 2022 (4 pages) Office Action dated Nov. 25, 2022 (5 pages).
For Chinese Patent Application No. 202110079982.8 filed Jan. 21, 2021 First Office Action (9 pages) Search Report (2 pages).
Search Report for German Patent Application No. 10 2020 000 334.6 dated Dec. 15, 2021 (5 pages).
For European Patent Application No. 21 00 0011: European Search Report dated Sep. 23, 2021 (5 pages) Extended European Search Rpoert dated Oct. 1, 2021 (15 pages).
For Japanese Patent Application No. 2021-007111: Decision of Refusal dated May 12, 2022 (6 pages) Notice of Reasons for Refusal Feb. 1, 2022 (8 pages) Search Report dated Jan. 25, 2022 (13 pages).
For Russian Patent Application No. 2021101095/04 filed Jan. 20, 2021: Office Action dated Dec. 20, 2021 (6 pages) Office Action and Search Report dated Jul. 30, 2021 (9 pages).
Ex parte Quayle Office Action dated Dec. 1, 2021 for U.S. Appl. No. 16/709,025.
For U.S. Appl. No. 16/600,260: Office Action dated Oct. 4, 2021. Response to Final Office Action, filed Jul. 13, 2022 for U.S. Appl. No. 16/600,260.
Office Action, dated Aug. 28, 2023, for Canadian Patent Application No. 3,106,631.
For Chinese Patent Application No. 202110079982.8 Second Office Action, dated Mar. 25, 2023 Third Office Action, dated Aug. 21, 2023 Rejection Decision, Nov. 27, 2023.
For European Patent Application No. 21 000 011.3: European Communication dated Mar. 11, 2024 European Communication dated Oct. 24, 2023.
For Indonesian Patent App. No. P00202100426 Substantive Exam Results, dated Oct. 10, 2023 Indonesian Patent No. IDP000091201 issued Dec. 18, 2023.
For Indian Patent Application No. 202134001796 Examination Report dated Oct. 1, 2021 Grant and Recordal, Jan. 16, 2024.
Result of Examination Report for DE 10 2014 017 556.1 dated Nov. 28, 2014.
European Search Report and Search Opinion for EP15 00 3362 dated May 9, 2016.
Office Action for DE 10 2014 017 556.1 dated Jul. 7, 2015.
Search Report for German Application No. 10 2018 008 127.4 dated Oct. 13, 2018.
Chinese Search Report dated Oct. 12, 2019 for Application No. 201910965569.4.
European Search Report dated Feb. 18, 2020 for EP 19 00 0457.
German Search Results for Application No. 10 2018 008 127.4 filed Oct. 13, 2018.
Office Action dated Mar. 16, 2023 for U.S. Appl. No. 17/151,814.
Office Action dated Mar. 16, 2023 for U.S. Appl. No. 17/490,106.
For U.S. Appl. No. 17/151,814: Interview Summary dated Dec. 22, 2023 Response filed Jan. 4, 2024.
Search Report for German Application No. 10 2016 015 051.3, filed Dec. 16, 2016.
European Search Opinion for European Application No. 17 00 1985, filed Dec. 16, 2017, 15 pages (with machine language translation).
German Search Report for Application No. 10 2016 015 051.3, filed Dec. 16, 2016, 1 page.
European Search Report dated Apr. 26, 2018, for EP 17 00 1985, filed Dec. 16, 2017, 3 pages.
German Office Action dated Oct. 25, 2017 for Application No. 10 2016 015 051.3, 3 pages (with machine language translation).
Search Report and Office Action dated Sept 8, 2023 for European Patent Application 23000013.5.
Office Action dated Aug. 17, 2022 for German Patent Application No. 10 2022 000 351.1.
For Chinese Patent Application No. 202110079982.8: Reexamination decision dated May 23, 2024.
For EP Patent Application No. 21 000 011.3: Office Action dated Jun. 26, 2024.
For Mexican Patent Appl. No. MX/a/2021/000885: Office Action dated May 16, 2024.

* cited by examiner

PROCESS AND EQUIPMENT TO REGULATE THE THICKNESS OF ORIENTED TUBULAR FILM THAT IS MANUFACTURED IN A FILM BLOWING PROCESS

FIELD OF THE INVENTION

The invention focuses on a process to regulate the thickness of an oriented tubular film that is manufactured in a film blowing process as well as equipment to implement the aforementioned process.

The invention concerns a process to regulate the thickness of oriented tubular film that is manufactured in a film blowing process, laid flat and repositioned using an oscillating take-off unit, oriented monoaxially in machine direction using an orientation unit and subsequently wound with a winder. The thickness profile of the film tube produced with the blown film line is regulated using a film thickness profile control system that has segmented control zones and at least two measuring units for the film thickness such that the specified target film thickness profile exhibits deviations from a uniform film thickness in the form of one or two thin spots opposite each other, which serve to compensate for film thickness changes across the film width which occur during the monoaxial orientation in machine direction so that a film web is produced as a result of orientation whose transverse thickness profile has as few deviations as possible from the target film thickness across the entire width of the film web. The invention furthermore concerns equipment to implement the aforementioned process.

BACKGROUND

The film blowing process is ideal for producing plastic film that is suitable for subsequent orientation. In this context, plastic granules are fed via a dosing unit to an extruder where they are melted and conveyed to a film die head. The film die head has an annular die from which the extruded polymer melt discharges before it is formed to a film tube and then inflated using cooling air. At the same time, the tubular film is cooled from the outside by means of cooling air exiting a cooling ring. The tubular film then passes through a calibration basket. Once the plastic solidifies, the film tube is laid flat with a collapsing unit before being routed to an oscillating take-off unit. The laid-flat film is then routed to a winder and is wound to a film reel. The laid-flat film tube can be oriented in machine direction in a monoaxial orientation unit located between the oscillating take-off unit and winder, or alternatively, the laid-flat film tube can be oriented in an orientation unit within the oscillating take-off unit between a pair of take-off rolls and turning bar, which results in film with a reduced film thickness. Orientation improves film properties such as tensile strength, stiffness, transparency, barrier properties and/or the ease of movement through the machine. This type of film is used, for example, in flexible packaging.

In the production of tubular film, film thickness profile control systems are employed that have segmented control zones. It is possible with these systems to regulate the film thickness profile such that the thickness deviations from an average film thickness around the entire bubble circumference are as minor as possible.

In patent DE 10 2009 033 171 B4, a process to regulate the film thickness profile of tubular film manufactured in a film blowing line and subsequently oriented in machine direction in its laid-flat state using a monoaxial orientation unit. The patent DE 10 2009 033 171 B4 furthermore describes equipment to implement the process. In order to achieve film with an average film thickness that is as uniform as possible, one or two thin spots are imprinted opposite each other on the tubular film. In order to regulate the film thickness profile, the actual film thickness profile around the circumference of the film tube between the segmented control system and the oscillating take-off unit is measured and the actual film thickness profile of the laid-flat and oriented film is measured across its width between the orientation unit and the winder. The actual film thickness profiles that are measured with the measuring units are routed to the system control unit and the film thickness across the segmented control zone is then regulated by means of a cascaded control.

Patent DE 10 2019 215 492 A1 describes a film blowing line with at least two thickness measuring units to measure the film thickness profile downstream of an orientation unit, whereby the thickness is measured at least once at the individual layer of the film.

Patent DE 10 2016 012 424 A1 describes a process to operate a film blowing line where a tubular film with two thin spots exits the film die head which is then laid flat in such a way that the thin spots now form the film edges which are then cut off using a cutting unit.

During longitudinal orientation with an orientation unit, the film is stretched in accordance with the orientation ratio in machine direction, thus reducing the thickness of the film. In the case of laid-flat tubular film and film webs, the film simultaneously necks in transverse direction, which causes the width of the film to decrease. This "necking" results in the oriented film thickening slightly in a progressive manner from the centre to the edges of the film, even though prior regulation in the film blowing process resulted in a thickness that was as constant as possible. This increase in thickness is particularly visible in the area around the film edges. And this in turn leads to an edge build-up on the film reel during downstream winding. With increasing reel diameter, the edges of the film web stretch more and more—a serious disadvantage for downstream processing steps such as printing or lamination.

It is possible to reduce necking and thus edge build-up on the film reel by taking measures such as the smallest possible orientation gap, suitable roll coating, mechanical or electrostatic fixing of the film edges, optimised temperature management or suitable selection of the polymer materials. Additionally, thin spots are imprinted on the tubular film during manufacture in order to counteract the edge build-up. However, the reduction thus achieved is inadequate for many downstream processing steps. Only suitable trimming of the film edges will result in the remaining film web having a sufficiently low deviation of the thickness profile from the target film thickness, and this is essential for subsequent film winding and downstream processing. Trimming, however, is always associated with film wastage and a narrower width of film.

SUMMARY OF THE INVENTION

An aspect of the invention is therefore to create a solution which makes it possible using an orientation line to monoaxially orient in machine direction a film tube produced with a film blowing line in such a way after it has been laid flat and oscillated in the oscillating take-off unit that the final film displays a thickness profile where the thickness increase from the middle of the film to the edges is as minor as possible and the flatness of the film is improved. At the same time, the loss of film width caused by trimming the edges should be kept as low as possible.

The objective of regulating the film thickness using a process of the type described above is solved by the invention-design process disclosed herein and by equipment as also disclosed herein.

The objective is solved with the invention-design process to regulate the film thickness in that the film thickness profile of the tubular film manufactured with the film blowing line is regulated such that the orientation process results in a film whose transverse thickness profile has as few deviations as possible from the target film thickness across the entire film width. The basis for regulating the film thickness is formed by measurement of the actual film thickness profile prior to orientation of the tubular film and measurement of at least one single-layer film subsequent to orientation. In order to further optimise the result, actuators of the segmented control zones imprint thin spots of a defined geometry on the tubular film in order to compensate the thin spot geometry influenced by the running direction of the oscillating take-off unit.

In state-of-the-art production of tubular film, film thickness profile control systems are usually employed that have segmented control zones. The objective is to obtain tubular film with a film thickness profile whose thickness deviations around the entire bubble circumference are as minor as possible.

To this end, a measuring device is installed downstream of the film die head and upstream of the collapsing equipment which measures the actual film thickness profile around the circumference of the film tube. The actual profile is compared with the target profile and if deviations are registered, defined intervention in the control system of the film blowing process is carried out.

If an orientation unit is integrated into the film blowing line, in addition to the aforementioned measurement, a second measurement of the actual film thickness profile is taken which measures the laid-flat film tube across the film width downstream of orientation. Both profiles are routed to a cascaded control in order to permit taking defined intervention in the film blowing process.

After cooling, the film tube is laid flat with a collapsing unit before being routed to an oscillating take-off unit. The task of the oscillating take-off unit is to improve the reel quality of the wound film by distributing the thickness profile which is fixed with reference to the film die head over the entire width of the flat film. Repositioning or rather distributing the thick and thin spots over the entire width of the reel results in film reels that are entirely free from gauge bands.

The laid-flat film tube is routed to an orientation unit, also known as an MDO (mono-directional orientation system), and is then monoaxially oriented in machine direction. The orientation unit is installed downstream of the oscillating take-off unit. Alternatively, an orientation unit can be installed downstream of the collapsing equipment in the take-off unit. Oscillation of the tubular film takes place downstream of orientation.

The term "orientation unit" is understood here to mean any unit which achieves an alteration to the length of the film web. This includes stretching, which leads both to an irreversible as well as to a reversible stretching of the film.

The oriented film is wound to reels with the winder.

If orientation takes place downstream of the oscillating take-off unit, the laid-flat film tube is slit open at the edges either on one side or both sides by means of a cutting unit located between the oscillating take-off unit and upstream of the orientation unit.

After being cut open on both sides, the laid-flat film tube is then routed separately to two orientation units. Alternatively, the film tube which is cut open on both sides can be routed to an orientation unit as a double-layer film web, i.e. folded over with the layers on top of each other. If the laid-flat film tube is only slit open on one side, it is unfolded and routed to the orientation unit as a single-layer film web.

The laid-flat film tube can also be routed direct to the orientation unit and subsequently slit open at the edges on either one or both sides.

If the orientation unit is located in the take-off unit, the film is slit open on either one or both sides downstream of the oscillating take-off unit. Alternatively, the film tube is slit open upstream of the pair of take-off rolls in the collapsing equipment.

In the event that the edge zones are not thin enough, a defined width of the edges on each side of the double-layer or single-layer film web are trimmed so that only the middle of the film web of uniform thickness is wound to reels in the winder.

The edge trimming is performed downstream of orientation and upstream of winding the film web. A device for edge trimming can be provided for this purpose as a separate device between orientation unit and winder, but can also be integrated into the orientation unit or in the winder.

The single-layer film webs can then be routed to the winder. The film webs are then either fed separately or folded over as double-layer film webs to the winder and are then wound to reels.

The thickness profile is influenced via the segmented control zones, e.g. by means of air temperature control or air volume control, alternatively by means of heat sources such as infrared sources.

The segmented control zones can be integrated into the film die head, into a stationary or rotating cooling ring, into a thickness control unit between film die head and collapsing equipment or into a downstream thickness control unit which moves synchronously with the oscillating take-off unit. Several segmented control zones can also be combined.

In order to obtain a uniform film thickness of tubular film for orientation, film thickness profile control systems are employed that have segmented control zones.

A measuring device to measure the actual film thickness profile is installed upstream of orientation preferably between the film die head and take-off unit. Alternatively, it can also be located between the take-off unit and orientation unit. In the first case, the film thickness is measured around the circumference of the film tube and thus at one single layer of the film. In the second case, the film thickness is measured across the width of the laid-flat film tube, i.e. the double-layer film web. The measured film thickness profile is compared with the target profile in order to allow taking defined intervention in the film blowing process via the segmented control zones in the case of deviations.

In order to counteract the influences of the orientation process in the form of thickening at the edges of the film web, a second measurement of the actual film thickness profile is taken downstream of orientation and upstream of winding. Measuring the film thickness at the double-layer film web across the width is known from prior art.

Pursuant to the present invention, the second actual film thickness profile is measured across the width of the single-layer film web, which is slit open at the edges on both sides to make two separate layers.

In another invention design, the actual film thickness profile is measured once across the width of the double-layer film web and once across the width of one of the two single-layer film webs. In this case, the film thickness profile of the second single-layer film web is calculated from the difference between the profile of the double-layer film web and the measured single-layer film web.

In another invention design, the actual film thickness profile is measured across the width of the laid-flat film tube that is slit open along the edge of one side and opened up to form a single-layer film web.

Measurement of at least one single-layer film web makes it possible to measure the film more accurately and completely. This more precise measurement makes a more accurate control of the film thickness possible, especially in the edge zones via the segmented control zones.

As is known from the state of the art, if the actual film thickness profile is measured at the double-layer film web downstream of orientation, one obtains the sum total of the thickness from both superposed film webs. In this context, it can happen that one half of the film is thinner at the edge than the other half. This can be prevented if the actual film thickness profile is measured across the width of the film web of the single-layer film web.

In another invention design, the actual film thickness profile is measured downstream of orientation and upstream of winding not across the entire width of the film web, but rather only across the width of the edge zones which exhibit the most severe film thickness deviations caused by orientation and by imprinting the thin spots.

In another invention design, the actual film thickness profile is measured at the cut-off edge trims and the remaining main section of film with a sensor or separate sensors. The advantage here is that an accurate and complete measurement of all subsections is performed.

In another invention design, the second actual film thickness profile is measured downstream of trimming the edges only at the remaining main section of film. The disadvantage here is the less marked influence on the film profile of the edges and thus the greater loss of film web width.

It is also possible to measure the first and the second actual film thickness profile several times in succession.

In a preferred invention design, the edges are trimmed downstream of the second measurement across the film width and upstream of winding the film web.

The width of the remaining thick spots or thin spots in the edge zones can then be derived from the actual film thickness profile of the second measurement, and the width of the edges destined for cutting off can be determined. The position of the knives in the unit to cut off the edge trims can then be adjusted manually or automatically.

The width of the edge trims is adjusted every time the reel in the winder is changed.

In another invention design, the edges are trimmed upstream of orientation. This makes it possible to extract the air trapped between the film webs. Over and above this, edges that are too thick or which display wrinkles can be removed.

Because the laid-flat tubular film web necks during orientation and thick spots develop in the edge zones, the specified setpoint film thickness value of the circumferential profile is not constant during the film blowing process but is rather set such that after monoaxial orientation in machine direction and as a result of thickness deviations during orientation, a film with a thickness profile with as few deviations as possible across the complete film width is produced. For example, a tubular film is produced during the film blowing process that has two thin spots opposite each other. The tubular film is then laid flat in such a way that the thin spots now form the film edges and the oriented film displays a thickness profile that has as few deviations as possible from the target film thickness. The same applies to tubular film that is cut open on both sides. In the case of a film tube that is cut open along one side, a tubular film is produced during the film blowing process that has only one thin spot. The film tube is then cut open through the middle of this thin spot in order to assign the thin area equally to the left-hand and right-hand film edges, so that after orientation, the film displays a thickness profile that has only a few deviations.

Up to now, the actuators of the segmented control zones were addressed symmetrically around the planned thin spot in order to imprint the film tube with thin spots, e.g. in the form of a Gaussian distribution; due to the influence of the oscillating take-off, however, this resulted in a differently pronounced thin spot geometry at the flanks of the thin spots.

In order to further optimise the result, it is possible by addressing the individual actuators and/or controlling the individual actuators of the segmented control zones to imprint thin spots of a defined geometry on the tubular film in order to compensate the thin spot geometry caused by the running direction of the oscillating take-off unit.

In the running direction of oscillation, the flank of the thin spot is different to that produced contrary to the running direction. With movement in the running direction of oscillation, the movement is right into the cold film so that the film does not react strongly to the control intervention, whereas when the movement is contrary to the running direction of oscillation, the movement is into the warm film so that the film reacts more strongly to the control intervention. Thin spots with differently shaped flanks are thus formed.

By measuring the thickness of the edge zones at the single-layer film web, the actual film thickness profile on each side of the film web can be measured precisely, so that the actuators of the segmented control zone can be addressed individually, and thus a customised asymmetrical thin spot profile is imprinted on the film so that a film with a thin spot having almost symmetrical flanks results.

In another design invention, imprinting of the thin spots superposes the control unit and is performed with the help of one different function each for the right-hand and the left-hand flank of the thin spot. This function takes account of the different behaviour of the film when imprinting the thin spot caused by the running direction of oscillation. The left-hand and right-hand side of the thin spot is understood to mean one side of the thin spot in each case, seen from the edge of the laid-flat film tube.

After cooling, the tubular film is laid flat and is then routed to an oscillating take-off unit where the turning bars and deflection rolls of the oscillating take-off reposition the film in such a way that it always hits the stationary horizontal deflection roll downstream of the take-off unit, from where it is deflected vertically down to the orientation unit and/or winder. This oscillating movement serves to continuously shift the actual thickness profile, which means that the specified thin spot in the film—which is produced in the stationary vertical extrusion section of the system—must track the oscillating movement of the oscillating take-off unit in order to ensure that the film is fed to the orientation unit with the requisite target film thickness profile, i.e. with the thinner film edges. This is accomplished by an offset value being superposed on the segmented control zones of the film profile control system which takes the angular misalignment caused by the oscillating take-off unit into account and which tracks the movement of the turning bars. In other words, one or more circumferential points of the tubular film laid flat with the take-off unit is/are allocated to one or more segmented control zones. The control algorithm ensures that only the thin spots in the target profile oscillate parallel to the oscillating take-off unit.

An algorithm is applied to calculate and continuously correct the specified target thickness profile for the film blowing process from the actual film thickness profile measured across the width of the film web downstream of the orientation unit, by means of which even the deviations in the thickness profile of the finished film caused by the orientation process are regulated and an increase of the reel quality is achieved, the objective being to produce film reels of a uniform reel diameter.

At the same time, this achieves a marked reduction of the width of the film strips that are cut off from both sides of the film during trimming.

In another invention design, the reel profile is measured.

The actual film thickness profile across the winding width can be measured with the second measuring device using a summation approach, by means of which the possibility arises of superimposing actual reel profile values on the target thickness profile, in order to eliminate even the most minor thickness deviations which always appear in the same area of the finished film, because they can only be established after prolonged periods when they manifest themselves as changes in the reel diameter.

In another invention design, the reel profile of the reel as it is being formed is photographed with a camera. Either a line-scan or an area-scan camera is used. It can now be derived from the reel profile whether edges of the right width were trimmed successfully or whether it needs to be adjusted.

The control function to address the individual segmented control zones can be calculated by superimposing the following thickness profiles under application of an algorithm. These segmented control zones can be integrated into the film die head, into a stationary or rotating cooling ring, into a thickness control unit between film die head and collapsing equipment or into a downstream thickness control unit which moves synchronously with the oscillating take-off unit. Several segmented control zones can also be combined.

The thickness profiles are:
  the basic profile, which is the measurement of the actual thickness profile around the circumference of the film tube between die head and orientation unit or across the width of the laid-flat film between take-off unit and orientation unit;
  the orientation profile, which is the measurement of the entire film width downstream of the orientation unit; it takes the angular misalignment caused by the oscillating take-off as well as compensation of the thickness of the film edge zone during orientation into account;
  the reel profile, which represents a sum total of the measured orientation profiles with a corresponding rating or is measured with a camera fitted to the reel as it forms.

In addition, the geometry of the thin spots caused by the running direction of the oscillating take-off unit is taken into account, as well as a superimposition of an offset value, which considers the angular misalignment of the oscillating take-off unit and which tracks and constantly corrects the turning movement of the turning bar.

In view of the fact that the following control circuits are superposed, this constitutes a cascaded control system:

regulation of the film thickness around the film bubble circumference during the film blowing process;
regulation of the film thickness across the width of the oriented film;
regulation of the reel diameter across the reel width.

Whereby there is at least one superposition of the basic profile and orientation profile.

The target film thickness profile can also be entered manually into the control system, whereby the profile must then be continually matched to the movement of the turning bars.

The process to regulate the film thickness can also be employed in systems that have no oscillating take-off unit. In this case, no tracking function is necessary.

BRIEF DESCRIPTION OF THE DRAWINGS

Other details, features and advantages of the subject matter of the invention can be found in the claims as well as in the following description of the associated drawings in which a preferred embodiment of the invention is shown by way of example.

The drawings show.

DETAILED DESCRIPTION

Figure 1:
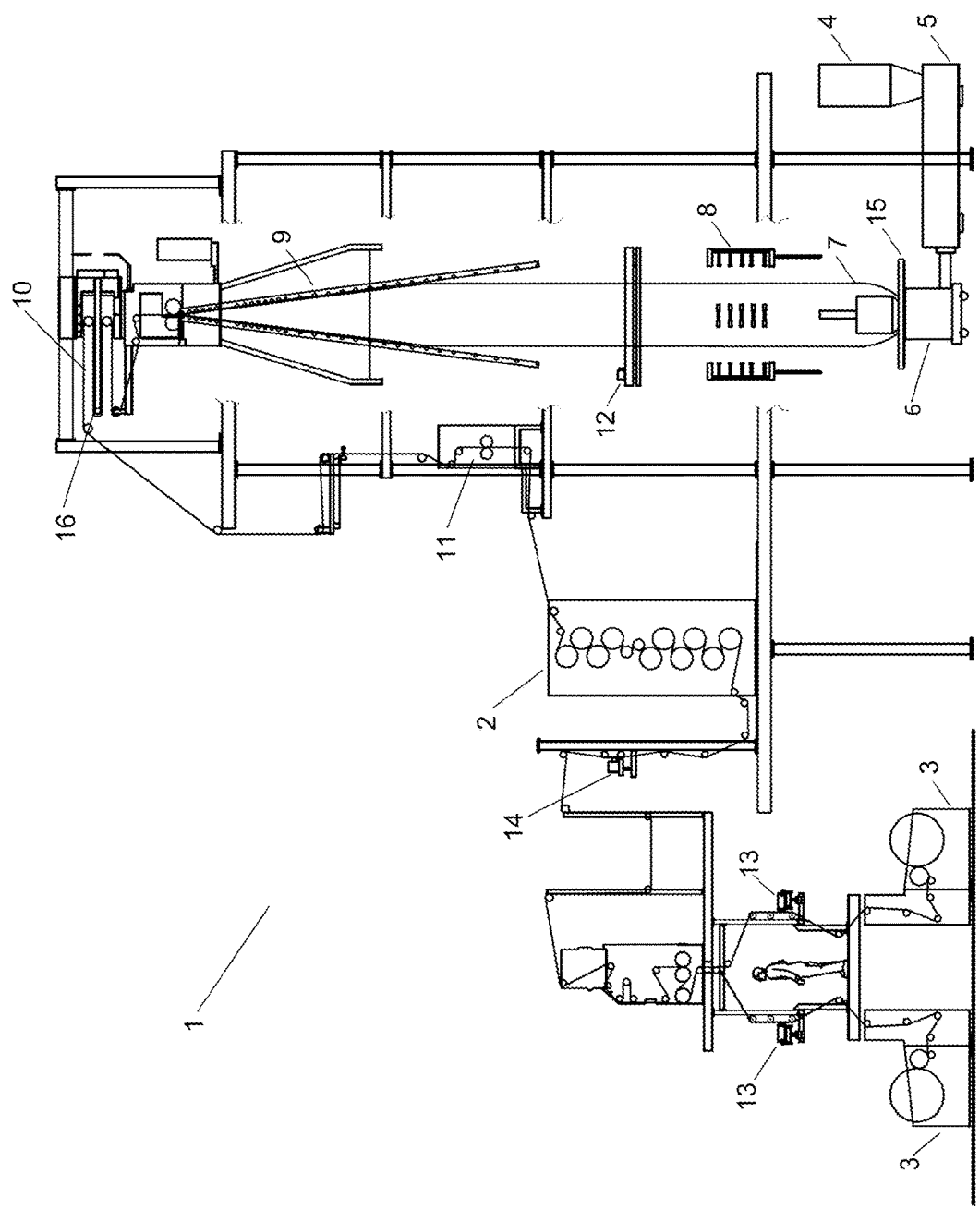
FIG. 1: Film blowing line with downstream orientation unit in which the invention-design process to regulate the film thickness is applied.

FIG. 1 shows a film blowing line (1) with downstream orientation unit (2) and two winders (3). A dosing unit (4) supplies the resin granules to the extruder (5) where they are melted, homogenised and then routed to the die head (6). The production of multi-layer film necessitates the use of several extruders, with the number of extruders corresponding to the number of film layers. The die head (6) has an annular die through which the extruded melt exits. The cooling air needed to inflate the tubular film (7) is supplied through the die head (6). The tubular film (7) is cooled from the outside by means of cooling air exiting a cooling ring (15) and is then routed through a calibration basket (8). Once the plastic has set, the film tube (7) is laid flat with the collapsing boards (9) and taken off and repositioned continuously with the oscillating take-off unit (10). The film is then oriented monoaxially in machine direction with the orientation unit (2).

The film tube (7) is slit open on both sides upstream of the orientation unit (2) in a pre-take-off unit (11) and is then routed to the orientation unit (2) as a double-layer film web. Alternatively, an annealing unit or temperature control unit can be combined with the pre-take-off unit (11) (not shown here). After orientation, both superposed single-film webs are separated from each other and routed to a winder (3) in each case. After the edges of the film are trimmed in the winders (3), it is wound to film reels or rolls.

The film blowing line (1) is equipped with a film thickness profile regulation system. It consists of segmented control zones and at least two measuring test points (12) and (13) to measure the actual film thickness profile.

To permit regulation of the film thickness profile, it is necessary to measure the actual film profile—at least at two points. The actual film thickness profile around the circumference of the film tube (7) is measured between the film die head (6) or the segmented control system in the cooling ring (15) and the collapsing boards (9) or oscillating take-off unit

(10) by the measuring device (12). The measuring device (12) used to measure the actual film thickness profile of the inflated film tube (7) is installed to rotate around the film tube (7) preferably at a constant height above the die head (6).

The actual film thickness profile of each of the two oriented single-layer film webs is measured by the measuring unit (13) across their width between the orientation unit (2) and the winder (3) subsequent to the webs being separated.

The complete film blowing process is regulated by the system control unit, especially the drives, the cooling air, the segmented control zones—which are integrated into the cooling ring (15), the die head (6) or into a separate thickness regulation—as well as the take-off speed of the tubular film (7).

The actual film thickness profiles that are measured with the measuring units (12) and (13) are routed to the system control unit and after a target-actual comparison, are transmitted to the segmented control zone in the form of signals.

Alternatively, the orientation unit (2) can also be integrated into the oscillating take-off unit downstream of the collapsing boards (9) and upstream of the turning bars (16); this possibility is not shown in the figures.

The double-layer film web is slit open either before or after orientation. Downstream of the oscillating take-off unit (10), the film tube (7) is separated into two single-layer film webs and each single-layer film web is routed to a winder (3). The first measuring device (12) is installed upstream of the collapsing equipment (9) and measures the actual film thickness profile around the circumference of the film tube (7). The second measuring units (13) are located downstream of the oscillating take-off unit (10) after the laid-flat and oriented film tube (7) has been cut open into single layers and upstream of the winder (3), and measure the actual film thickness profile across the width of each single-layer film web. Alternatively, the actual film thickness profile can be measured downstream of orientation by one of the measuring units (13) at the single-layer film web and by the measuring unit (14) at the double-layer film web.

The edges are trimmed before the film webs are wound in the winder (3).

Figure 2:
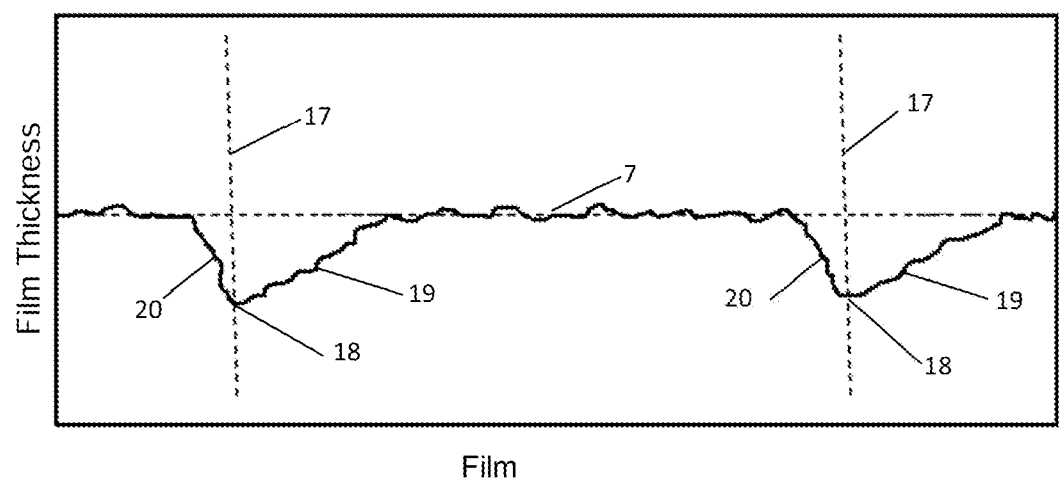
FIG. 2: Target film thickness profile of a film tube with two thin spots of asymmetric thin spot geometry.

FIG. 2 shows a faulty actual film thickness profile with two thin spots (18) which are to be regulated in accordance with the invention-design process. The actuators in the control zone which imprint the opposite thin spots (18) onto the film tube (7) are addressed symmetrically. The running direction of the oscillating take-off unit (10) is taken into account thereby in that in running direction of the oscillating take-off unit, a flat flank (19) is imprinted onto the thin spot (18) because the movement is into the cold film, and in that contrary to the running direction of the oscillating take-off unit, a steep flank (20) is imprinted onto the thin spot (18) because the movement is into the warm film.

The film tube is cut open at the two positions (17), and then the two flat film webs are routed to the orientation unit (2) or are routed in each case to a separate orientation unit. The film is then measured, the edges trimmed and the film wound in the film winder (3).

REFERENCE NUMERALS

1 Blown Film Line
2 Orientation system
3 Winder
4 Dosing unit
5 Extruder
6 Film die head
7 Tubular film
8 Calibration basket
9 Collapsing frame
10 Oscillating take-off unit
11 Pre-take-off unit
12 Thickness measurement unit
13 Thickness measurement unit
14 Thickness measurement unit
15 Cooling ring
16 Turning bar
17 Interface
18 Thin spot
19 Flat flank of thin spot
20 Steep flank of thin spot

The invention claimed is:

1. A method to regulate thickness of an oriented tubular film that is manufactured in a film blowing process, laid flat and repositioned using an oscillating take-off unit, oriented monoaxially in machine direction using an orientation unit and subsequently wound with a winder, the method comprising:
using a film thickness profile control system that has segmented control zones and at least two measuring units for film thickness to regulate a thickness profile of the tubular film such that a specified target film thickness profile exhibits deviations from a uniform film thickness in the form of one or two thin spots opposite each other, which serve to compensate for film thickness changes across the film width which occur during the monoaxial orientation in the machine direction,
so that film is produced as a result of orientation whose transverse thickness profile has as few deviations as possible from the target film thickness across the entire width of the film web,
wherein thin spots of a defined geometry are imprinted on the tubular film by means of individual selection and/or control of individual actuators of the segmented control zones, whereby influences of the running direction of the oscillating take-off unit on the thin spot geometry are taken into consideration,
wherein the geometry of the flanks of the thin spots is different as a function of the running direction of the oscillating take-off unit, and
wherein different functions are integrated into a control algorithm of the film thickness profile control system for the left-hand and right-hand flank of a thin spot.

2. The method of claim 1, wherein at least an initial actual film thickness profile of the tubular film upstream of orientation is measured, and at least a second actual film thickness profile of the laid-flat and oriented tubular film downstream of orientation and upstream of winding the film web is measured.

3. The method of claim 2, wherein the second actual film thickness profile across the film width is measured of at least one single-layer film web.

4. The method of claim 2, wherein the tubular film has been cut along edges to produce edge trims and wherein the second actual film thickness profile across a width of the edge trims is measured at the single-layer film web downstream of orientation and upstream of winding the film web.

5. The method of claim 2, wherein the control algorithm to address the individual segmented control zones comprises a superimposition of
a basic profile derived from a film thickness profile regulation of a film blowing line a orientation profile from repositioning of the tubular film tube by the oscillating take-off unit and influences of the orientation process and under consideration of the geometry of the thin spots caused by the running direction of the oscillating take-off unit, an offset value is superposed which takes angular misalignment caused by the oscillating take-off unit into account and which tracks movement of turning bars and is continually adjusted.

6. The method of claim 5, wherein a reel profile of a reel is measured by adding up the film thickness across the winding width derived from measurement of the second actual film thickness profile.

7. The method of claim 6, wherein the reel profile of the reel as it forms is recorded by a camera.

8. The method of claim 2, wherein the initial actual film thickness profile of the tubular film upstream of orientation is measured around the circumference of the inflated tubular film.

9. The method of claim 2, wherein the second actual film thickness profile across the film width is measured at both single-layer film webs of the slit-open and laid-flat tubular film web downstream of orientation and upstream of winding the film web.

10. The method of claim 1, wherein the extruded tubular tube is regulated around the circumference to match a specified target film thickness profile by means of the film thickness profile control system.

11. A system to implement the method to regulate thickness of an oriented tubular film that is manufactured in a film blowing process of claim 1, the system comprising a film blowing line with an oscillating take-off unit, at least one orientation unit, at least one winder, and at least one film thickness profile control system.

12. The system of claim 11, wherein the film thickness profile control system comprises segmented control zones, at least two measuring devices to measure the film thickness, one to measure the actual thickness profile of the tubular film downstream of a die head and upstream of the orientation unit, and at least one to measure the actual thickness profile of the oriented film downstream of the orientation unit, as well as a master control system and evaluation unit.

13. The system of claim 12, wherein the measuring units to measure the actual film thickness profile of the oriented tubular film downstream of the orientation unit and upstream of the winder are installed at least at one of a slit-open and separate single-layer film web.

14. The system of claim 13, wherein a device to perform the edge trimming is located downstream of the orientation unit and downstream of the measuring device downstream of the orientation unit, whereby positioning of cutting units of the device to perform the edge trimming can be set to manual or automatic.

15. The system of claim 12, wherein the segmented control zones are integrated into a film die head, a stationary or rotating cooling ring, a thickness control unit between the film die head and collapsing equipment, or a downstream thickness control unit which moves synchronously with the oscillating take-off unit, or combinations thereof.

16. A method to regulate thickness of an oriented tubular film that is manufactured in a film blowing process, laid flat and repositioned using an oscillating take-off unit, oriented monoaxially in machine direction using an orientation unit and subsequently wound with a winder, the method comprising:

using a film thickness profile control system that has segmented control zones and at least two measuring units for film thickness to regulate a thickness profile of the tubular film such that a specified target film thickness profile exhibits deviations from a uniform film thickness in the form of one or two thin spots opposite each other, which serve to compensate for film thickness changes across the film width which occur during the monoaxial orientation in the machine direction, so that film is produced as a result of orientation whose transverse thickness profile has as few deviations as possible from the target film thickness across the entire width of the film web, wherein thin spots of a defined geometry are imprinted on the tubular film by means of individual selection and/or control of individual actuators of the segmented control zones, whereby influences of the running direction of the oscillating take-off unit on the thin spot geometry are taken into consideration, and wherein an edge trim width which will be cut off during a downstream trimming step is derived from measurement of an actual film thickness profile at a single-layer film web and is then manually or automatically adjusted.

* * * * *